(12) United States Patent
Mattar

(10) Patent No.: US 6,895,813 B2
(45) Date of Patent: May 24, 2005

(54) LOW-FLOW EXTENSION FOR FLOW MEASUREMENT DEVICE

(75) Inventor: Wade M. Mattar, Wrentham, MA (US)

(73) Assignee: Fox Boro Company, Fox Boro, MA (US)

( * ) Notice: Subject to any disclaimer, the term of this patent is extended or adjusted under 35 U.S.C. 154(b) by 0 days.

(21) Appl. No.: 10/359,469

(22) Filed: Oct. 9, 2002

(65) Prior Publication Data
US 2003/0167836 A1 Sep. 11, 2003

Related U.S. Application Data

(63) Continuation of application No. 09/557,352, filed on Apr. 25, 2000, now abandoned.

(51) Int. Cl.[7] .................................................. G01F 7/00
(52) U.S. Cl. ........................................................ 73/197
(58) Field of Search .......... 73/195–198, 861.22–861.24, 73/861.42, 861.27, 861.28, 861.08, 861.11

(56) References Cited

U.S. PATENT DOCUMENTS

| | | | | |
|---|---|---|---|---|
| 4,090,179 A | * | 5/1978 | Hirano | 73/196 |
| 4,429,571 A | * | 2/1984 | Kullmann et al. | 73/197 |
| 5,005,426 A | * | 4/1991 | Lew | 73/861.22 |
| 5,090,240 A | * | 2/1992 | Baker et al. | 73/197 |
| 5,230,245 A | * | 7/1993 | Kamiunten et al. | 73/195 |
| 5,291,780 A | * | 3/1994 | Thomas et al. | 73/195 |
| 6,053,053 A | * | 4/2000 | Huotari | 73/861.22 |
| 6,422,092 B1 | * | 7/2002 | Morrison et al. | 73/861.04 |

* cited by examiner

*Primary Examiner*—Harshad Patel
(74) *Attorney, Agent, or Firm*—David Barron, Esq.; Richard L. Sampson, Esq.

(57) ABSTRACT

A method and apparatus for measuring flow rates is disclosed. At least one of a non-vortex based low-flow measurement and a vortex based flow measurement is taken. The measurement or measurements are communicated to a central processor. The processor analyzes the data provided and makes a determination as to the more accurate measurement, if there is more than one measurement. The flow rate is calculated by the processor and is based on either the singular or the more accurate measurement. Further enhancements include diagnosis of meter performance, redundancy of measurements, and re-calibration of either measurement device based on information from the other device.

34 Claims, 4 Drawing Sheets

LOW-FLOW EXTENSION FOR FLOW MEASUREMENT DEVICE

This application is a Continuation of U.S. patent application Ser. No. 09/557,352 entitled Low-Flow Extension For Flow Measurement Device, filed on Apr. 25, 2000 now abandoned.

FIELD OF THE INVENTION

The present invention relates to measuring devices, and more particularly to the combination of multiple measurement devices to seamlessly measure a range of flow rates.

BACKGROUND OF THE INVENTION

In general, fluid flows through an area, for example a pipe, in a substantially axial flow pattern if there are no obstructions or other external forces. An object placed in that axial flow pattern creates a disturbance. Vortices then result along both sides of the object as the fluid flows past. Each vortex created sheds from the object as the fluid flow carries it downstream. The generation and shedding of the vortices alternates between the two sides of the object and is continuous with the flow of fluid past the object.

It is possible to sense and measure a low-pressure area associated with the vortex in the fluid flow. It is this characteristic that is the foundation for vortex flowmeters. In a vortex flowmeter the design includes an object, otherwise known as a bluff body, placed in the flow of the fluid. Both sides of the bluff body alternately generate vortices and subsequently shed them. A pressure sensor, such as, for example, a pressure transducer, positioned downstream of the bluff body senses each vortex that is shed from the object. Each time a vortex flows past the pressure transducer, it causes the pressure transducer to generate a pulse having an amplitude proportional to the fluid density and the square of the fluid flow rate. The vortex shedding frequency, i.e., the rate at which vortices are shed, is proportional to the fluid flow rate.

When there is sufficient Reynolds Number and fluid velocity to consistently generate vortices, for example a Reynolds value of 5,000 or higher, simple calculations utilize the vortex shedding frequency to determine the flow rate of a fluid, so long as the rate is constant or has a relatively slow rate of change.

However, if the Reynolds Number of the fluid is generally less than 5,000, the generation of vortices will be either inconsistent, too miniscule for the sensor to measure, or non-existent. A Reynolds Number higher than 5,000 with a low fluid velocity will also create such conditions because fluid velocity that is too low will prevent the sensor from functioning correctly. This is a common problem in vortex metering, which makes it prohibitive to utilize vortex meters for metering situations in which a wide range of flow rates is occurring that includes low-flow rates less than the flow velocities at which consistent, measurable vortices are generated.

This barrier creates several inconveniences to users of vortex flowmeters, which results in the elimination of vortex metering as an option for many applications. Some examples include applications having start-up modes, batching, or intermittent flow rates.

For the foregoing reasons, as well as others not discussed, there is a need for a measuring device an instance of which is a flowmeter having the reliability and features of a vortex-metering device at normal flow conditions, with the added feature of being able to measure flow rate during low-flow to zero-flow conditions.

SUMMARY

The present invention is directed to a measuring device for measuring, e.g. fluid flow. The basic structure of one embodiment includes a vortex flow measuring device, and a non-vortex measuring device. The two metering devices are in communication with a common processor to form a flowmeter.

In a further embodiment, the flowmeter includes a low-flow measuring device with a usable range of flow measurement which at least partially overlaps with a usable range of flow measurement of the vortex flow measuring device. In still a further embodiment, the vortex flow measuring and non-vortex measuring devices are each maintained in separate housings. In still another embodiment, the vortex flow measuring and non-vortex measuring devices are each maintained in a single housing. In yet further embodiments, the processor is maintained in one of the separate housings, or alternatively, in the single housing. In still further embodiments, the low-flow measuring device utilizes thermal flow, pressure drop, ultrasonic, or magnetic sensing technology.

The flowmeter is utilized in measuring flow rate of a fluid flow. To do so, in one embodiment, the flowmeter utilizes at least one low-flow measurement device and at least one vortex measuring device to attempt measurement of a fluid flow rate. To determine a flow rate, a measurement value is obtained from one of the measuring devices. This measurement is communicated said measurement value to a processor, and interpreted by the processor. An indication of flow rate is determined from the measurement value.

In still another embodiment, multiple measurement values are obtained and interpreted with the processor to determine which value is a more substantially accurate representation of the flow rate. A flow rate is then identified based on the representation. In yet another embodiment, multiple measurement values are obtained and interpreted with the processor to determine which is more substantially accurate. Subsequently, the more accurate measurement value is utilized in re-calibrating other of the measuring devices. In still a further embodiment, a plurality of measurement values are interpreted and manipulated to create various reports, charts, tracking information, and analyses of a flow stream. In still a further embodiment, multiple sensors provide measurement values to a network in which a network processor performs desired calculations to determine output such as flow rate.

BRIEF DESCRIPTION OF THE DRAWINGS

The aforementioned features and advantages, and other features and aspects of the present invention, will become better understood with regard to the following detailed description and accompanying drawings, wherein.

DETAILED DESCRIPTION

Figure 1:
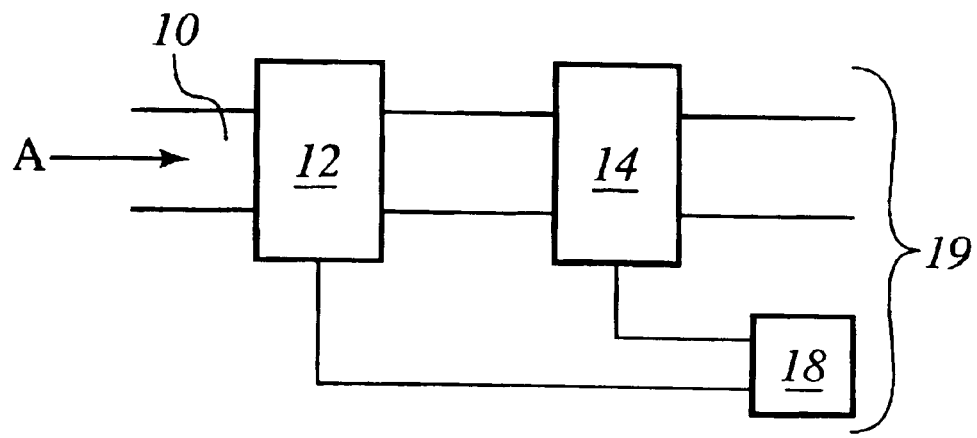
FIG. 1 is a block diagram illustrating a first example configuration of a flowmeter embodiment.

Referring now in detail to the drawings wherein like parts are designated by like reference numerals throughout, FIGS. 1–7 illustrate a vortex-shedding-based flow measurement device 12 in combination with a non-vortex-shedding-based flow measurement device 14. Both devices are in communication with each other, and/or a common processor, to form a single metering unit 19. To summarize, the vortex-shedding-based flow measurement device 12 measures relatively higher flow rates; while the non-vortex-shedding-based flow measurement device 14 measures relatively low flow rates; the two measurements being electronically combined into a single, wide flow range measurement.

As previously discussed, vortex flowmeters rely on the physical principle that as a generally axial flow fluid flows past an object, vortices are created along each of the two sides of the object. The vortex shedding frequency is directly proportional to the rate of the flow. Some other sensing means capable of utilization for detecting vortex shedding include but are not limited to, pressure (including capacitive and piezoelectric), thermal, and ultrasonic.

In FIG. 1, a block diagram illustrates a first example embodiment of the present invention. Fluid (not shown) flows in the direction of Arrow A through pipe 10. A vortex-shedding-based flow measuring device 12 is placed in line with pipe 10. The fluid flows through vortex measuring device 12. If the Reynolds Number and/or fluid velocity are sufficient to create measurable vortices, vortex measuring device 12 senses the vortices and generates a signal relating to a flow rate. A processor 18 receives the signal. Different methods for communicating the signal include, but are not limited to, wire, fiber-optics, radio frequency, infra-red, internet, intranet, or even telephonic including cellular or digital transmission.

If the fluid Reynolds Number and/or velocity are less than that required for generation of vortices that the measuring device is capable of sensing, then vortex flow measuring device 12 will not register any vortices and an appropriate signal will be communicated to processor 18 indicating that no measurement is available. Alternatively, the measuring device 12 sends no signal to processor 18, which would similarly indicate a condition of no available measurement.

Whether or not vortex flow measuring device 12 obtains a vortex measurement, the fluid continues past vortex flow measuring device 12, through pipe 10, to non-vortex-shedding-based flow measuring device 14, acting as the low-flow device, to complete the metering unit 19. In this example, non-vortex flow measuring device 14 measures low-flow to zero flow conditions. If the rate of the flow is such that it is low enough to register on non-vortex flow measuring device 14, non-vortex flow measuring device 14 will measure the flow and communicate a flow rate related signal to processor 18. If the flow rate is such that it is faster than a rate measurable by non-vortex flow measuring device 14, then non-vortex flow measuring device 14 will not register a valid flow rate. At such time, either no signal will be communicated by non-vortex flow measuring device 14 to processor 18, or perhaps a signal indicating that no reading is available will be communicated to processor 18. The fluid will continue to flow downstream.

Figure 2:
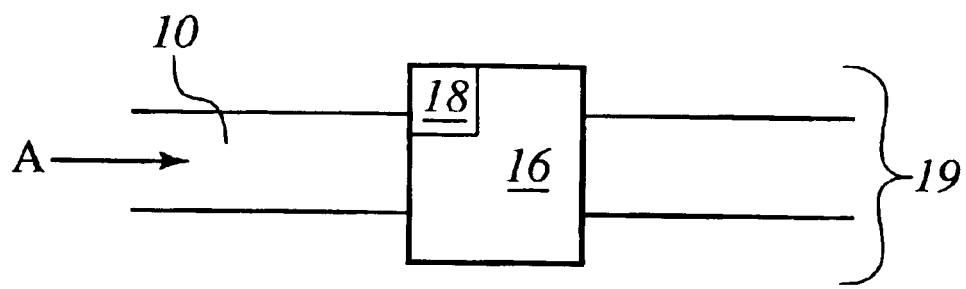
FIG. 2 is a block diagram illustrating a second example configuration of a flowmeter embodiment.

In FIG. 2, a block diagram illustrates a second example embodiment. In this embodiment, the fluid flows in the direction of Arrow A through pipe 10. Combined flowmeter 16 is placed in line with pipe 10. As fluid flows through pipe 10, it enters combined flowmeter 16. Combined Flowmeter 16 is comprised of a vortex shedding type measuring device (not shown), and a non-vortex shedding type measuring device (not shown) as the low-flow device, both contained within one flowmeter body and in combination with the processor 18, forming the entire metering unit 19. The fluid flows through the two measuring devices, and out the downstream side of the combined flowmeter 16. Dependant upon the Reynolds Number and/or velocity of the fluid, one of the two measuring devices within combined flowmeter 16 will provide an accurate reading of the flow rate, and a signal will be sent to processor 18, or no signal will result. As illustrated, processor 18 is not physically a part of the flowmeter 16; rather it is in a separate location upstream or downstream of the flowmeter 16. Alternatively, processor 18 could be internal to flowmeter 16.

Figure 3:
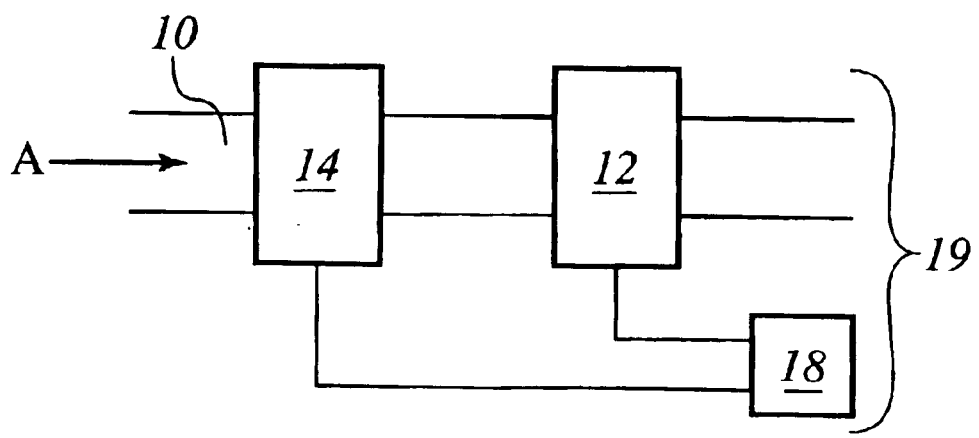
FIG. 3 is a block diagram illustrating a third example configuration of a flowmeter embodiment.
Figure 4:
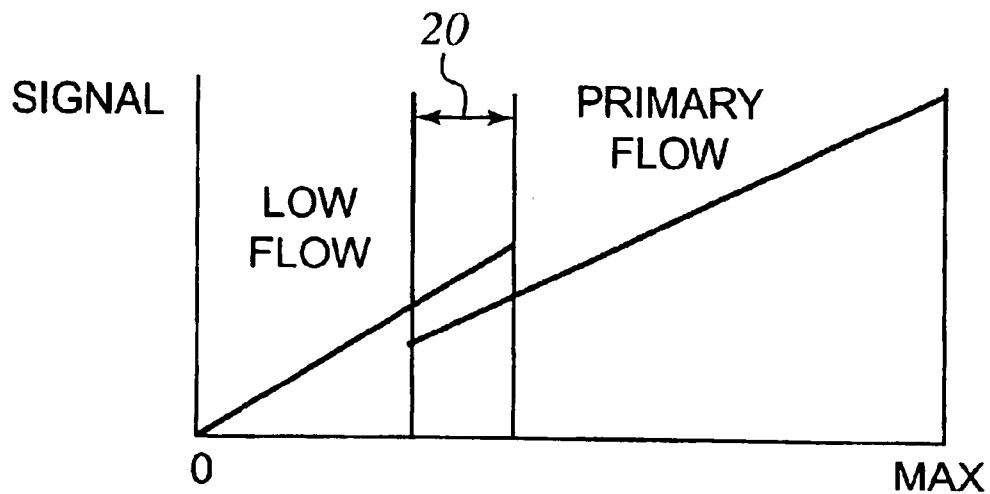
FIG. 4 is a graph illustrating an example low-flow measurement in conjunction with vortex flow measurement without electronic correction.

In FIG. 3, a block diagram illustrates a third example embodiment. In this embodiment, the fluid again flows in the direction of Arrow A through pipe 10. However, in this example, the low-flow non-vortex flow measuring device 14 is first in the pipeline and is the low-flow device. The second meter through which the fluid flows is the vortex shedding type flowmeter. Both meters still function together to create a single metering unit 19. Again, depending on the fluid flow rate, one or the other of the two flow measuring devices 12, 14 will obtain a more accurate measurement and deliver a signal to processor 18.

The choice, based on operating specifications, of actual vortex flow measuring device 12 and non-vortex flow measuring device 14 as the low-flow device, or the combined flowmeter 16, is important to the final effect of the two devices functioning together along with processor 18 as one metering unit 19. The range of flow velocities that will be measured is also a consideration in making the choice of device 12, 14. Ideally, there should be some overlap 20 (FIGS. 4 and 5) in the range of flow velocities measurable by each of the vortex flow measuring device 12 and the non-vortex flow measuring device 14. One of the two devices will act as the primary measurement device. As a flow rate increases or decreases through overlap 20, a transition occurs for the primary measurement device from vortex flow measuring device 12 to non-vortex flow measuring device 14, or vice versa, depending on the direction of the change in fluid flow rate. The existence of overlap 20 makes it possible to take measurements from either of the flow measuring devices 12, 14, when they are not at their extreme measurement capabilities where there is an increased risk of obtaining less accurate readings. Rather, as the flow rate approaches one flow measuring device's 12, 14 range limit, it simultaneously enters the other flow measuring device's 12, 14 usable range. This way the primary measurement is always taken from the device that is more likely to have a more accurate measurement based on its performance specifications and the Reynolds Number and/or velocity of the fluid.

Figure 5:
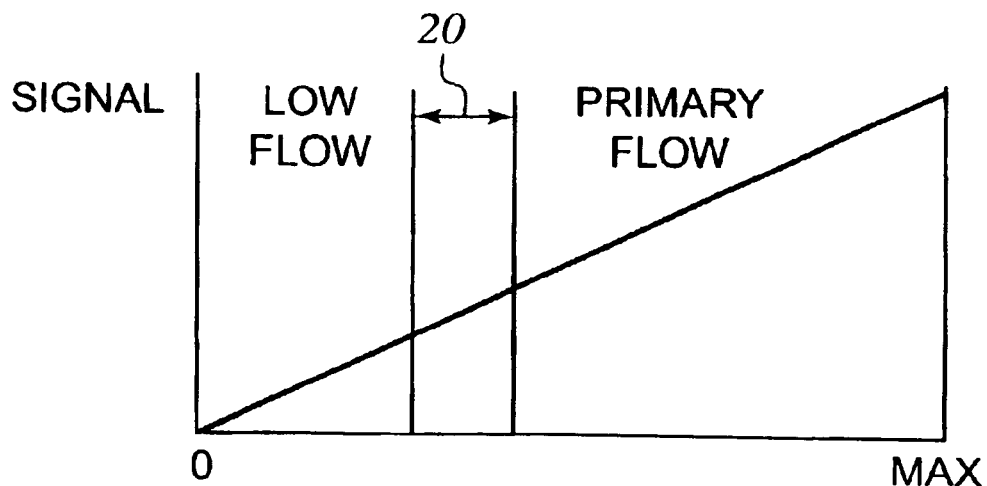
FIG. 5 is a graph illustrating an example low-flow measurement in conjunction with vortex flow measurement and with electronic correction.

Processor 18 will take the signals it receives from each of the meters, and transform the data into the desired information. Among some of the tasks that could be performed by the processor 18 and any surrounding electronics is adjusting the span of the low-flow measuring device to remove any discontinuities. A chart in FIG. 5 depicts an adjusted span.

As stated previously, the primary flow measurement at any one point in time is the more accurate flow measurement. While the measurements indicated are in the overlap 20 area, there will likely exist a deviation between what is acting as the primary measurement and the other measuring device. Adjusting or calibrating the non-primary measurement device produces agreement between the primary and non-primary measurements. Alternatively, assuming one has prior knowledge that a bias is likely, a adjusting for that bias brings the two measurements into agreement. If two points in the overlap 20 area are available with sufficient space between, then a linear fit with bias and span brings about the desired result. For the span adjustment process to occur, the processor first must interpret readings from both measuring devices and select one or the other as the primary measurement.

Modification of signals also adjusts for hysteresis issues passing through the overlap 20 area. In the overlap 20 area automatic or triggered re-calibration of the low-flow measurement by the primary measurement is also possible. Conversely, redundant measurement for a diagnostic of the primary measurement is also possible utilizing the overlap 20 with the low-flow measurement.

These various options of redundancy and re-calibration make possible a highly accurate, highly reliable, flow-measuring device without the high cost of more complex metering devices. Further, the use of meters such as a vortex flow measurement device to periodically re-calibrate the low-flow measurement device allows the utilization of a less expensive low-flow technology without sacrificing accuracy of measurements.

Figure 6:
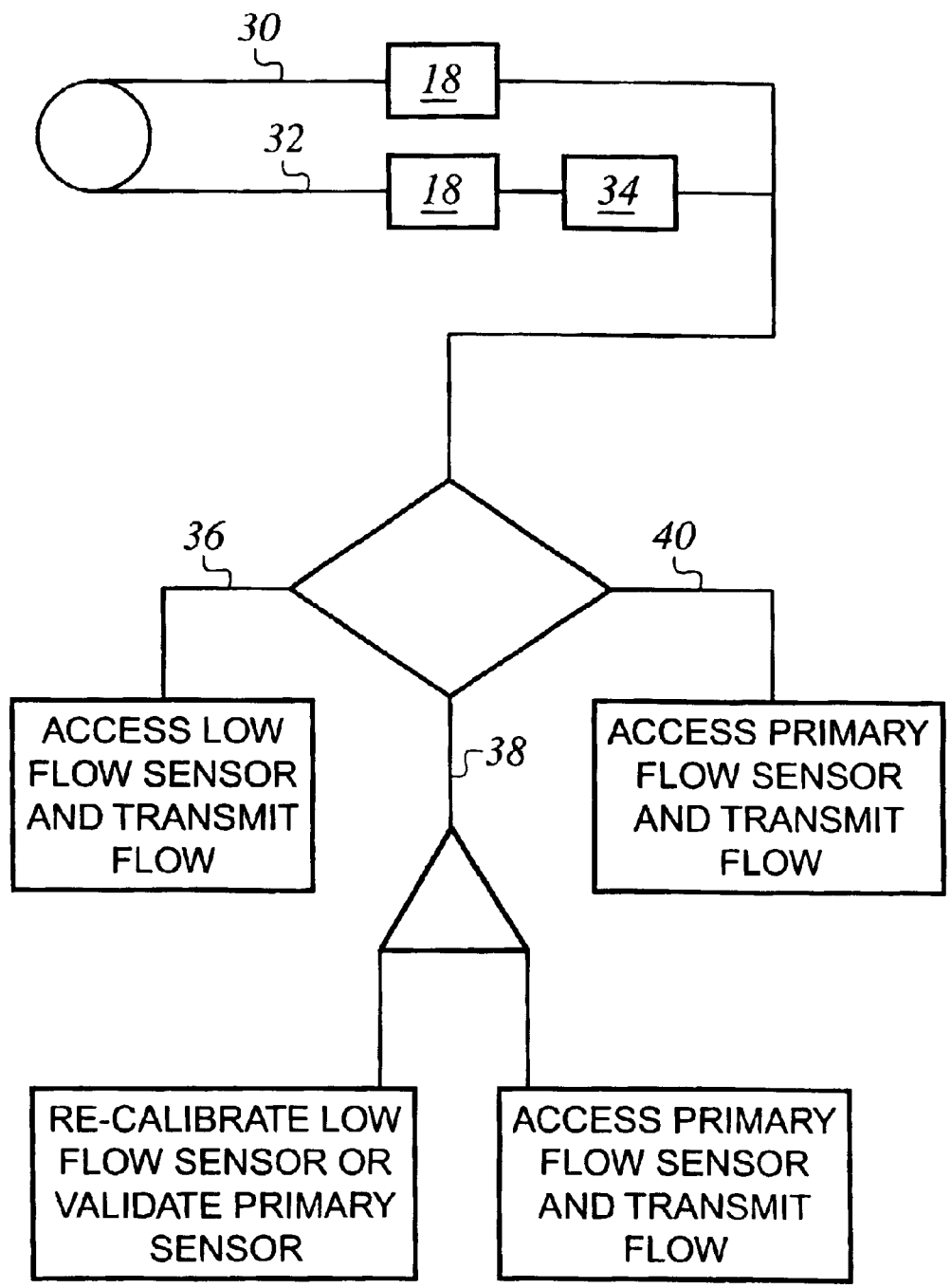
FIG. 6 is a flow diagram of one embodiment of a flowmeter with electronic correction pursuant to the present invention.

In FIG. 6 a flow diagram represents an example of how one embodiment of the present invention processes measurement signals. Measurement devices send vortex signal 30 and a non-vortex low-flow signal 32 to processor 18. FIG. 6 illustrates the decision tree that processor 18 implements to determine a final course of action. If processor 18 determines a low-flow condition exists, the processor 18 accesses the low-flow signal, passes the signal through the span adjust 34, and under the low flow zone branch 36 of the decision tree, transmits the flow rate. If processor 18 determines a flow condition in overlap 20 range, then according to the overlap flow zone branch 38 of the decision tree either the processor 18 re-calibrates the low-flow measuring device 14 based on the vortex measuring device 12, or validates the vortex measuring device 12 as the primary sensor and transmits the flow rate. If processor 18 determines there to be a flow rate in the normal or primary range, the processor 18 implements the primary flow zone branch 40, accesses the vortex measuring device 12, and transmits the flow rate.

In general, vortex measuring devices have very simple construction. The accuracy of vortex measuring devices is typically +−1 percent or better. Vortex measuring devices work equally well on liquids and gases. In addition, the measured fluid powers the vortex meter.

The low-flow measuring devices utilized in this type of application can vary in their measuring technology. The sensors should be relatively inexpensive and non-complex. Suitable technologies will depend on the actual environment in which the measuring is taking place, but could include thermal flow sensing, pressure drop/drag force, ultrasonic, magnetic, or a less accurate utilization of the vortex shedding sensor signal.

This invention anticipates the use of a plurality of vortex and non-vortex flow measuring devices on a single flow-stream able to communicate with a central processor. The devices would measure the flow in different ranges. As the flow velocity moves into a known overlap range, the primary flow measuring device downloads a function block from the secondary flow measuring device which instructs the secondary device whether to become the primary device. Meanwhile, the secondary device downloads a calibration function block from the primary device to calibrate its measurements when desired. In fact, a plurality of flow measurement devices could exist along a flow process. Given the various flow rate measurements, and the position of each of the flow measuring devices, the processor could determine the primary measurement device at any one point in time, and calibrate the remaining devices based on the primary measurement. The processor could use the data from the multiple measuring devices to determine the flow rate via an averaging scheme. The processor could generate various charts, graphs, and plots of the flow data at each measurement position for analysis and comparison of flow conditions.

Figure 7:
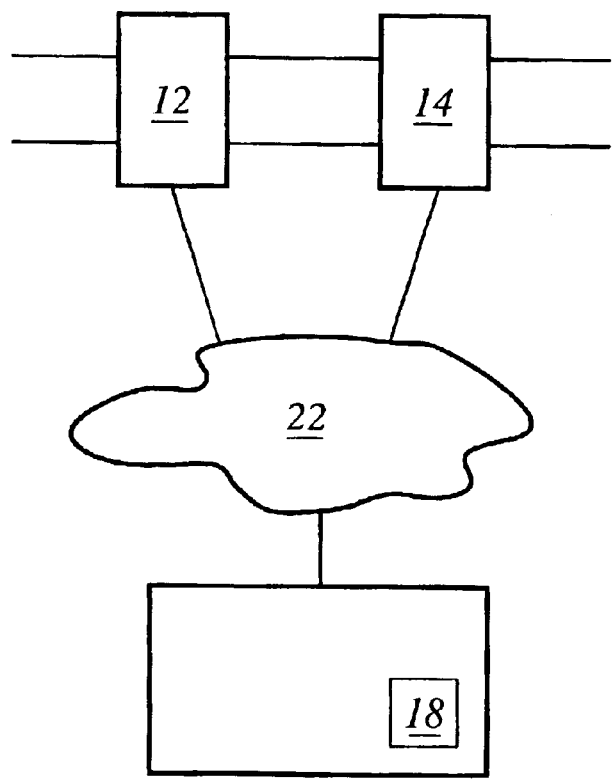
FIG. 7 is a block diagram illustrating a fourth example configuration of a flowmeter embodiment.
Figure 8:
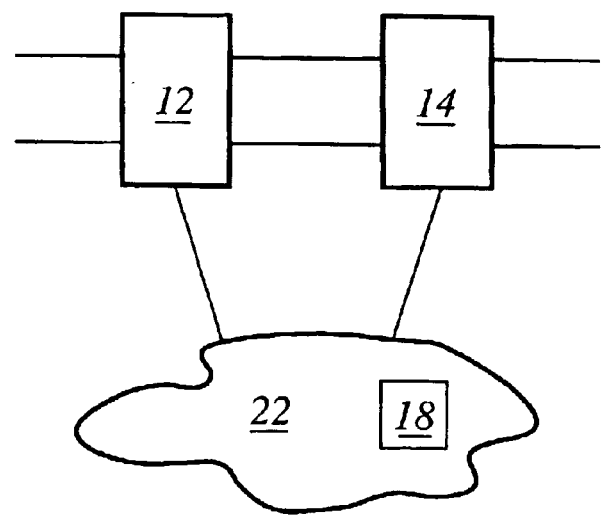
FIG. 8 is a block diagram illustrating a fifth example configuration of a flowmeter embodiment.

To further expand upon this feature of the invention, this vortex-shedding-based flow measurement and a non-vortex-shedding-based low-flow measurement seamless measuring device can be an element in an all digital, serial, two-way communication system or network 22 interconnecting sensors, actuators, arid controllers. As illustrated in FIG. 7, this invention anticipates meters 12, 14 in a flow stream. The meters 12, 14 transmit measurement readings into the network 22. The network 22 could even be a smaller portion of a larger industrial control system. A plurality of meters and meter combinations could all contribute measurement readings to a network 22. The processor 18 would then communicate with the network 22 to obtain the necessary data. The physical placement of the network 22 and the processor 18 with respect to the meters 12, 14 becomes irrelevant in this embodiment so long as there is a manner by which they all can communicate. Whatever information is gathered is simply contributed to the network 22, and the processor 18 then communicates with the network 22 to obtain whatever measurements it requires. The information could also include measurements of individual pressure sensors, valve positioners, etc. The processor 18 simply gathers information from various points of the network 22 and generates various calculations, analyses, data manipulations, and reports. The sensors that are positioned throughout a system can measure any number of different conditions.

In one embodiment, processor 18 could be a processor within the network. The processor 18 executes a function block which receives measurements from the sensors or meters 12, 14, combines them in accordance with the invention, and produces a flow output accessible by other entities and/or function blocks in the system.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may be varied substantially without departing from the spirit of the invention, and exclusive use of all modifications that come within the scope of the appended claims is reserved. It is intended that the invention be limited only to the extent required by the appended claims and the applicable rules of law.

What is claimed is:

1. A flowmeter comprising:
   a vortex flow measuring device;
   a non-vortex flow measuring device;

said vortex flow measuring device and said non-vortex flow measuring device configured to simultaneously measure flow in non-inclusive ranges;

wherein said vortex flow measuring device and said non-vortex flow measuring device are in communication with a common processor to form said flowmeter; and said common processor configured to selectively, utilize data from either one of said vortex flow measuring device and said non-vortex flow measuring device as the output of said flowmeter.

2. The flowmeter of claim 1 wherein said non-vortex flow measuring device has a usable range of flow measurement that at least partially overlaps with a usable range of flow measurement of said vortex flow measuring device.

3. The flowmeter of claim 2, wherein said vortex flow measuring device and said non-vortex measuring device are each maintained in separate housings.

4. The flowmeter of claim 3, wherein said processor is maintained in one of said separate housings.

5. The flowmeter of claim 2, wherein said vortex flow measuring device and said non-vortex measuring device are each maintained in a single housing.

6. The flowmeter of claim 5, wherein said processor is maintained in said single housing.

7. The flowmeter of claim 2 wherein said non-vortex flow measuring device utilizes thermal flow sensing technology.

8. The flowmeter of claim 2 wherein said non-vortex flow measuring device utilizes pressure drop sensing technology.

9. The flowmeter of claim 2 wherein said non-vortex flow measuring device utilizes ultrasonic sensing technology.

10. The flowmeter of claim 2 wherein said non-vortex flow measuring device utilizes magnetic sensing technology.

11. The flowmeter of claim 1 comprising a plurality of vortex flow measuring devices.

12. The flowmeter of claim 1 comprising a plurality of non-vortex flow measuring devices.

13. The flowmeter of claim 1 wherein the communication between the vortex flow measuring device and the non-vortex flow measuring device occurs across a network.

14. The flowmeter of claim 13 wherein the network is a local area network.

15. The flowmeter of claim 13 wherein the network is the Internet.

16. The flowmeter of claim 1 wherein said vortex flow measuring device and said non-vortex flow measuring device are configured to measure a flow rate in at least two non-inclusive ranges.

17. A method of measuring flow rate comprising:
(a) meaning the flow rate with a non-vortex flow measuring device to obtain a first measurement value;
(b) measuring the flow rate with a vortex flow measuring device to obtain a second measurement value;
(c) effecting said measuring (a) and said measuring (b) in non-inclusive ranges;
(d) effecting said measuring (a) and said measuring (b) simultaneously;
(e) transmitting the first measurement value and the second measurement value to a single processor communicably coupled to the non-vortex flow measuring device and the vortex flow measuring device; and
(f) selectively outputting either one of the first measurement value and the second measurement value as the flow rate.

18. The method of claim 17 wherein said selectively outputting comprises selectively outputting the first measurement value as the flow rate if the first measurement value is in a predetermined usable range of the vortex flow measurement device and selectively outputting the second measurement value as the flow rate if the second measurement value is in a predetermined usable range of the non-vortex flow measurement device.

19. The method of claim 17 further comprising:
determining whether the first measurement value and the second measurement value are in a predetermined overlap range;
calibrating the non-vortex flow measuring device utilizing the first measurement value obtained by the vortex flow measuring device if the first measurement value and the second measurement value are in the predetermined overlap range.

20. The method of claim 19 wherein said calibrating comprises adjusting the second measurement value to substantially equal that of the first measurement value.

21. The method of claim 20 wherein said calibrating further comprises adjusting the span of the non-vortex flow measuring device to remove any data discontinuities.

22. The method of claim 19 wherein said calibrating comprises adjusting for any hysteresis between data generated by the vortex flow measuring device and the non-vortex flow measuring device.

23. The method of claim 17 further comprising:
determining if the first measurement value and the second measurement value are in a predetermined overlap range;
utilizing the second measurement value obtained by the non-vortex flow measuring device in the performance of a diagnostic test on the vortex flow measuring device if the first measurement value and the second measurement value are in the predetermined overlap range.

24. The method of claim 17 wherein said measuring the flow rate with a non-vortex flow measuring device comprises measuring the flow rate with a plurality of non-vortex flow measuring devices to obtain a plurality of non-vortex flow measurement values.

25. The method of claim 17 wherein said measuring the flow rate with a vortex flow measuring device comprises measuring the flow rate with a plurality of vortex flow measuring devices to obtain a plurality of vortex flow measurement values.

26. The method of claim 17 wherein said transmitting occurs across a network.

27. The method of claim 26 wherein the network is a local area network.

28. The method of claim 26 wherein the network is the Internet.

29. A flowmeter comprising:
a plurality of process variable transmitters configured to transmit data corresponding to a single process parameter in at least two non-inclusive ranges;
a single processor communicably coupled to each of said plurality of process variable transmitters;
a function block in communication with each of said process variable transmitters;
said function block configured to selectively output data from either of said process variable transmitters to provide a single output in a combined range that incorporates the non-inclusive ranges.

30. The flowmeter of claim 29 wherein the plurality of process variable transmitters comprise at least one vortex flow measuring device and at least one non-vortex flow measuring device.

31. The flowmeter of claim 29 comprising two process variable transmitters configured to transmit data corresponding to a single process parameter in two non-inclusive ranges.

32. The flowmeter of claim 29 wherein the process parameter comprises flow rate.

33. The flowmeter of claim 29 wherein the at least two non-inclusive ranges partially overlap.

34. A flowmeter comprising:
   a vortex flow measuring device configured to generate data within a first range;
   a non-vortex flow measuring device configured to generate data within a second range;
   said vortex flow measuring device and said non-vortex flow measuring device disposed in communication with a common processor;
   said common processor configured to selectively utilize the data in either of said first and second ranges to generate an output in a combined range, wherein the combined range is greater than either the first range or the second range.

* * * * *